United States Patent
Sato et al.

(10) Patent No.: US 7,132,665 B2
(45) Date of Patent: Nov. 7, 2006

(54) SCINTILLATOR PANEL AND RADIATION IMAGE SENSOR

(75) Inventors: Hiroto Sato, Hamamatsu (JP); Takuya Homme, Hamamatsu (JP); Toshio Takabayashi, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

(21) Appl. No.: 10/407,248

(22) Filed: Apr. 7, 2003

(65) Prior Publication Data

US 2003/0205674 A1 Nov. 6, 2003

Related U.S. Application Data

(60) Division of application No. 09/738,951, filed on Dec. 18, 2000, now Pat. No. 6,573,506, which is a continuation-in-part of application No. PCT/JP99/03268, filed on Jun. 18, 1999.

(30) Foreign Application Priority Data

Jun. 18, 1998 (JP) .......................... P1998-171190

(51) Int. Cl.
*G01T 1/164* (2006.01)
(52) U.S. Cl. ..................................... 250/368
(58) Field of Classification Search ............. 250/483.1, 250/487.1, 361 R, 368, 370.11
See application file for complete search history.

(56) References Cited

U.S. PATENT DOCUMENTS

| 3,917,950 A | 11/1975 | Carlson ...................... 250/483 |
| 4,145,609 A | 3/1979 | Takami et al. .......... 250/361 R |
| 4,543,485 A * | 9/1985 | Ishii et al. ............... 250/487.1 |
| 5,148,029 A | 9/1992 | Persyk et al. ........... 250/361 R |
| 6,172,371 B1 | 1/2001 | DeJule et al. .......... 250/370.11 |

FOREIGN PATENT DOCUMENTS

| JP | 61-29788 | 2/1986 |
| JP | 62-216234 | 9/1987 |
| JP | 63-215987 | 9/1988 |
| JP | 63-216000 | 9/1988 |
| JP | 5-196742 | 8/1993 |
| JP | 5-203755 | 8/1993 |
| JP | 5-242841 | 9/1993 |
| JP | 7-27863 | 1/1995 |
| JP | 7-174857 | 7/1995 |
| JP | 7-218698 A | 8/1995 |
| JP | 7-244164 | 9/1995 |
| JP | 8-227520 | 9/1996 |
| JP | 8-271884 A | 10/1996 |

* cited by examiner

*Primary Examiner*—Constantine Hannaher
(74) *Attorney, Agent, or Firm*—Drinker Biddle & Reath LLP

(57) ABSTRACT

In a scintillator panel comprising a deliquescent scintillator formed on an FOP and a polyparaxylylene film covering over the scintillator, the FOP comprises a protective film peeling prevention rough at a side wall portion thereon coming into contact with the polyparaxylylene film.

2 Claims, 8 Drawing Sheets

SCINTILLATOR PANEL AND RADIATION IMAGE SENSOR

RELATED APPLICATIONS

This application is a divisional patent application under 37 C.F.R. § 1.53(b), of prior application Ser. No. 09/738,951 filed on Dec. 18, 2000 now U.S. Pat. No. 6,573,506, which is a continuation-in-part application of PCT/JP99/03268 filed Jun. 18, 1999, which claims priority to Japan Application P1998/171190, filed Jun. 18, 1998.

BACKGROUND OF THE INVENTION

1. Field of the Invention

The present invention relates to a scintillator panel and a radiation image sensor which are used for medical X-ray photography and the like.

2. Related Background Art

While X-ray sensitive films have been used in medical and industrial X-ray photography, radiation imaging systems using radiation detecting devices have been coming into wider use from the viewpoint of convenience and their storability of photographed results. In such a radiation imaging system, pixel data caused by two-dimensional radiation are acquired by a radiation detecting device as an electric signal, which is then processed by a processing unit, so as to be displayed onto a monitor.

Conventionally known as a scintillator panel for a radiation detecting device is one disclosed in Japanese Patent Application Laid-Open No. SHO 63-215987. In this scintillator panel, a scintillator made of CsI, which is a typical scintillator material, is formed on a fiber optical plate (FOP), i.e., an optical part constituted by a plurality of optical fibers bundled together. Since this scintillator is deliquescent, a water-impermeable protective film, i.e., polyparaxylylene film, is formed on the upper side of the scintillator, so as to protect the scintillator against moisture.

SUMMARY OF THE INVENTION

However, since side walls of the FOP are ground to flat surfaces, there have been cases where the polyparaxylylene film peels. Namely, when connecting a scintillator panel in which a scintillator is protected by a polyparaxylylene film to an imaging device (e.g., CCD or MOS-type solid-state image sensor) and the like, there are cases where side walls of the FOP are held with fingers, tweezers, or the like or are held with a jig in order to strictly carry out the positioning with respect to the imaging device, whereby the polyparaxylylene film may peel due to a frictional force acting on the polyparaxylylene film, thus allowing water to infiltrate therefrom, which is problematic in that characteristics of the scintillator, such as the resolution thereof in particular, deteriorate.

It is an object of the present invention to provide a scintillator panel and a radiation image sensor which can prevent the protective film of scintillator from peeling.

The present invention provides a scintillator panel comprising a scintillator formed on a substrate and a transparent organic film covering over the scintillator, wherein the substrate comprises a protective film peeling prevention rough at a portion thereon coming into contact with the transparent organic film surrounding the scintillator so as to contact with said transparent organic film.

Or the substrate may comprise the protective film peeling prevention rough at a portion coming into contact with the transparent organic film on the opposite side of the scintillator formed so as to contact with the transparent organic film.

According to the present invention, since the transparent organic film for protecting the scintillator is formed so as to reach the protective film peeling prevention rough provided in the substrate, the contact area between the transparent organic film and substrate is enhanced by the protective film peeling prevention rough, whereby the transparent organic film can be prevented from peeling.

The present invention is characterized in that a side wall of the substrate of the scintillator panel comprises the protective film peeling prevention rough. Since the protective film peeling prevention rough is disposed at a sidewall of the substrate, the present invention can prevent the transparent organic film from peeling even when a frictional force acts from the underside of the substrate toward the surface and the like.

The present invention is characterized in that the substrate of the scintillator panel is a fiber optical plate. According to the present invention, even when connected to an imaging device by way of the fiber optical plate so as to constitute a radiation image sensor, the transparent organic film can be prevented from peeling.

The present invention is characterized in that the substrate of the scintillator panel is a substrate made of Al. Also, the present invention is characterized in that the substrate of the scintillator panel is a substrate mainly composed of carbon.

The radiation image sensor of the present invention is characterized in that it further comprises an imaging device on the substrate side of the scintillator panel. Also, the radiation image sensor of the present invention is characterized in that it further comprises an imaging device on the top side of the scintillator of the scintillator panel. According to the radiation image sensor of the present invention, since the transparent organic film for protecting the scintillator is formed so as to reach the protective film peeling prevention rough provided in the substrate, the contact area between the transparent organic film and substrate is enhanced by the protective film peeling prevention rough, whereby the transparent organic film can be prevented from peeling.

The present invention provides a radiation image sensor comprising a deliquescent scintillator formed on an imaging device and a transparent organic film covering over the scintillator, wherein the imaging device comprises a protective film peeling prevention rough in at least a part of a portion thereof coming into contact with the transparent organic film. According to the present invention, since the transparent organic film for protecting the scintillator is formed so as to reach the protective film peeling prevention rough provided in the imaging device, the contact area between the transparent organic film and imaging device is enhanced by the protective film peeling prevention rough, whereby the transparent organic film can be prevented from peeling.

The radiation image sensor of the present invention is characterized in that the imaging device of the radiation image sensor comprises a protective film peeling prevention rough at a side wall thereof. Since the protective film peeling prevention rough is disposed at a side wall of the imaging device, the present invention can prevent the transparent organic film from peeling even when a frictional force acts from the underside of the imaging device toward the surface and the like.

The transparent organic film may cover all over the substrate for securely protecting the scintillator from the moisture.

The present invention will be more fully understood from the detailed description given hereinbelow and the accompanying drawings, which are given byway of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
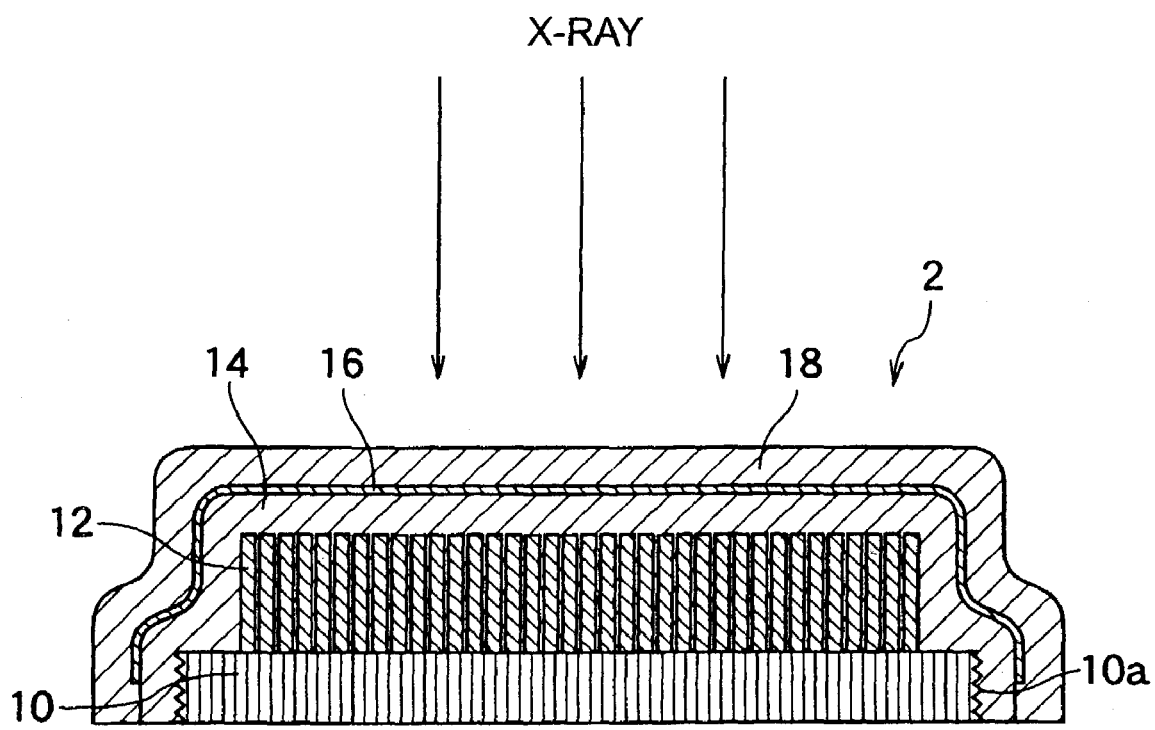
FIG. 1 is a sectional view of the scintillator panel in accordance with an embodiment of the present invention.

In the following, embodiments of the present invention will be explained with reference to the drawings. FIG. 1 is a sectional view of a scintillator panel 2 in accordance with an embodiment of the present invention. As shown in FIG. 1, the side wall of an FOP 10 in the scintillator panel 2 is provided with a protective film peeling prevention rough 10a. Also, one surface of the FOP 10 is formed with a scintillator 12 having a columnar structure adapted to convert incident radiation into visible light. Used in the scintillator 12 is Tl-doped CsI.

The scintillator 12 formed on the FOP 10 is covered with a first polyparaxylylene film (transparent organic film) 14 acting as a protective film, whereas the end portion of the first polyparaxylylene film 14 is formed so as to reach the protective film peeling prevention rough 10a. A surface of the first polyparaxylylene film 14 is formed with an Al film 16, whereas the surface of Al film 16 and the surface of first polyparaxylylene film 14 not formed with the Al film 16 are formed with a second polyparaxylylene film 18. This scintillator panel 2 is used as a radiation image sensor when connected to an unshown imaging device (e.g., a CCD, a thin-film transistor with a photodiode array, or a MOS-type solid-state imaging device) by way of the FOP 10.

Figure 2:
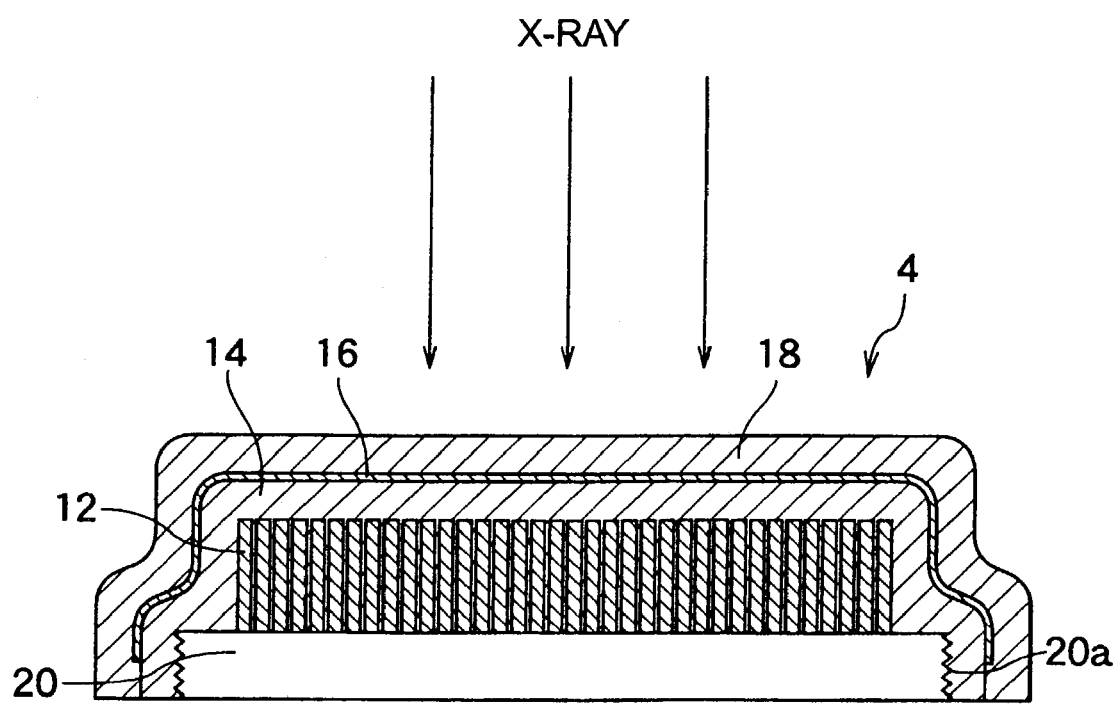
FIG. 2 is a sectional view of the radiation image sensor in accordance with an embodiment of the present invention.

FIG. 2 is a sectional view of a radiation image sensor 4 in accordance with an embodiment. As shown in FIG. 2, the side wall of an imaging device (CCD) 20 of the radiation image sensor 4 is provided with a protective film peeling prevention rough 20a. A scintillator 12 having a columnar structure is formed on the light-receiving surface of imaging device 20. The scintillator 12 is covered with a first polyparaxylylene film (transparent organic film) 14 acting as a protective film, whereas the end portion of the first polyparaxylylene film 14 is formed so as to reach the protective film peeling prevention rough 20a. A surface of the first polyparaxylylene film 14 is formed with an Al film 16, whereas the surface of Al film 16 and the surface of first polyparaxylylene film 14 not formed with the Al film 16 are formed with a second polyparaxylylene film 18.

With reference to FIGS. 3A to 4B, steps of making the scintillator panel 2 will now be explained. First, the side wall of FOP 10 is formed with the protective film peeling prevention rough 10a (see FIG. 3A). Namely, in a state where the part of FOP 10 other than its side wall is protected by a vinyl tape, a sandblast treatment is carried out at a pressure of 2 kgf/cm$^2$ with #800-mesh alumina. This sandblast treatment forms the protective film peeling prevention rough 10a in which Ra=0.32 μm and Rmax=2.1 μm (where Ra (center line average roughness) and Rmax (maximum height) are defined by JIS-B0601) according to the surface roughness measurement by use of a surface roughness meter (Surfcom 600A, Tokyo Seimitsu).

Figure 3A:
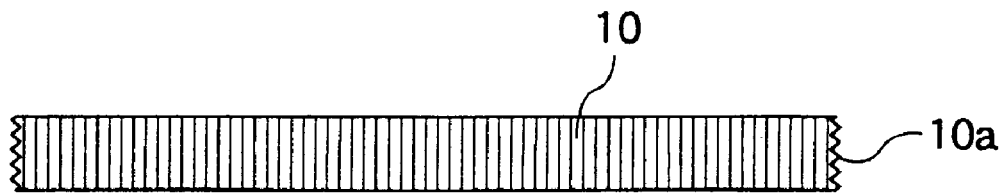
FIGS. 3A, 3B, 3C, 4A, and 4B are views showing sequential steps of making the scintillator panel in accordance with an embodiment of the present invention.
Figure 3B:
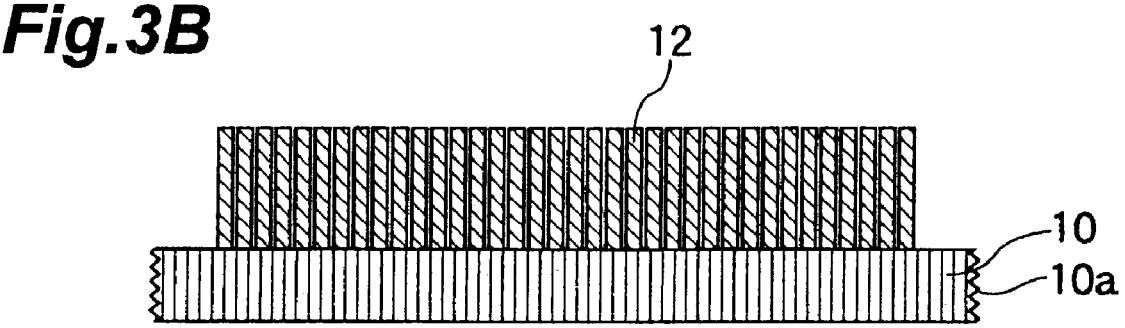
Figure 3C:
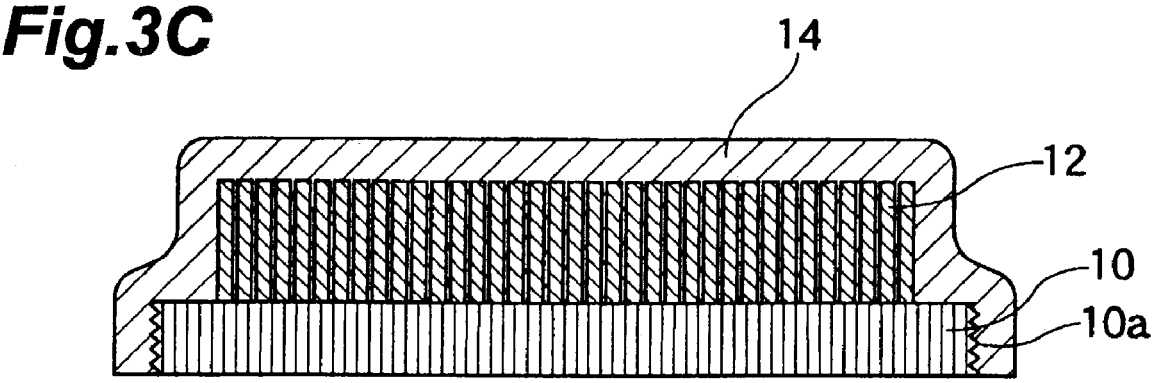

Subsequently, on one surface of the FOP 10, columnar crystals of Tl-doped CsI are grown by vapor deposition method, so as to form the scintillator 12 by a thickness of 200 μm (see FIG. 3B). Since CsI, which forms the scintillator 12, is high in moisture absorbency so that it will deliquesce by absorbing vapor in the air if left exposed, the first polyparaxylylene film 14 is formed by CVD method in order to prevent this from occurring. Namely, the substrate 10 having formed the scintillator 12 is put into a CVD apparatus, and the first polyparaxylylene film 14 is formed with a thickness of 10 μm. As a consequence, the first polyparaxylylene film 14 is formed on all surfaces of the scintillator 12 and reaches the position of the protective film peeling prevention rough 10a disposed at the side wall of FOP 10 (see FIG. 3C).

Figure 4A:
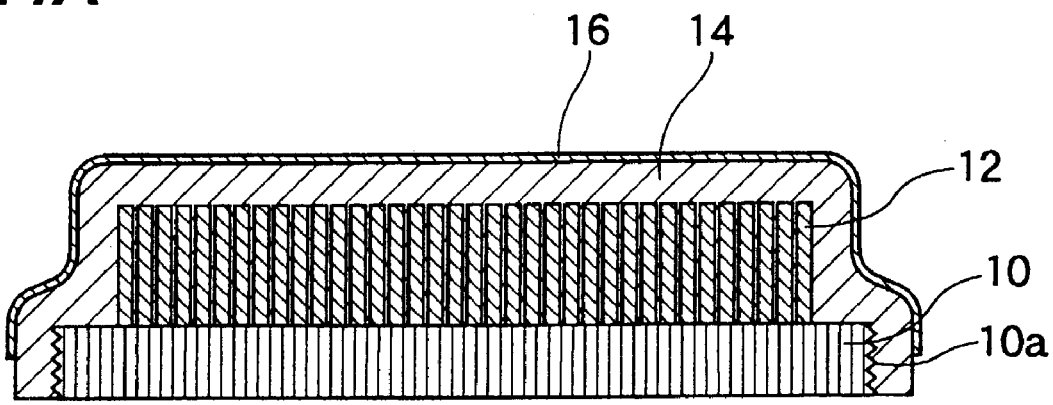

Then, the Al film 16 is deposited by a thickness of 300 nm on the surface of first polyparaxylylene film 14 on the scintillator 12 side (see FIG. 4A). Here, the Al film 16 is formed in an area covering over the scintillator 12, since it is aimed at improving the moisture resistance of scintillator 12.

Figure 4B:
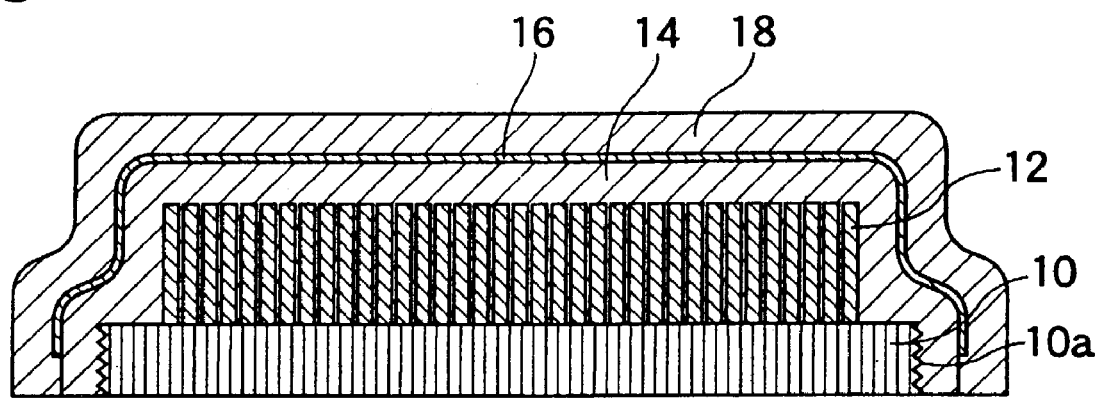

Further, on the surface of Al film 16 and the surface of first polyparaxylylene film 14 not formed with the Al film 16, the second polyparaxylylene film 18 is formed with a thickness of 10 μm again by CVD method (see FIG. 4B). When this step is completed, the making of scintillator panel 2 ends.

The radiation image sensor 4 shown in FIG. 2 is made by a method similar to the method of making scintillator panel 2. Namely, the sidewall of imaging device 20 is formed with the protective film peeling prevention rough 20a by a method similar to that used for forming the side wall of FOP 10 with the protective film peeling prevention rough 10a. Subsequently, by a method similar to that in the case of making the scintillator panel, the scintillator 12 is formed, and the first polyparaxylylene film 14, Al film 16, and second polyparaxylylene film 18 are formed on the scintillator 12. When this step is completed, the making of radiation image sensor 4 ends.

Since the side wall of FOP 10 is provided with the protective film peeling prevention rough 10a, the scintillator panel 2 in accordance with this embodiment can prevent the end portion of first polyparaxylylene film 14 from peeling due to friction and the like. Also, since the side wall of imaging device 20 is provided with the protective film peeling prevention rough 20a, the radiation image sensor 4 in accordance with this embodiment can prevent the end portion of first polyparaxylylene film 14 from peeling due to friction and the like. Therefore, the moisture resistance of scintillator 12 can remarkably be improved.

Though the protective film peeling prevention rough 10a is formed by subjecting the side wall of FOP 10 to the sandblast treatment at a pressure of 2 kgf/cm$^2$ with #800-mesh alumina in the above-mentioned embodiment, the protective film peeling prevention rough 10a may be formed by carrying out a sandblast treatment at a pressure of 2 kgf/cm$^2$ with #1500-mesh alumina. The latter case yields a protective film peeling prevention rough in which Ra=0.19μm and Rmax=1.42 μm according to the surface roughness measurement by use of a surface roughness meter (Surfcom 600A, Tokyo Seimitsu).

Also, the protective film peeling prevention rough 10a may be formed by excimer laser irradiation, wet etching processing, and the like. When forming grooves of 500 μm (l)×10 μm (w)×10 μm (d), for example, in the case of excimer laser irradiation, it is preferred that at least three of them be formed per 1 mm$^2$. It is also preferred that the ratio of width (w)/depth (d) in the grooves be 1.0 or less.

In the case of wet etching processing, on the other hand, numbers of pits having a depth of 5 μm can be formed when the FOP 10 are immersed into a 1-N HNO$_3$ solution for 5 minutes while the part other than the side wall thereof is protected. The side wall of FOP 10 may be cut with a cutter knife or the like, so as to form the protective film peeling prevention rough 10a. The protective film peeling prevention rough 10a may also be formed by Carborundum grinding.

Though CsI(Tl) is used as the scintillator in the above-mentioned embodiment, it is not restrictive; and CsI(Na), NaI(Tl), LiI(Eu), KI(Tl), and the like may also be used.

While FOP and CCD are used as the substrate for forming a scintillator and the imaging device, respectively, in the above-mentioned embodiment, substrates made of Al, substrates mainly composed of carbon such as those made of C (graphite) and those made of amorphous carbon, substrates made of Be, substrates made of SiC, and the like which are substrates having a favorable X-ray transmissivity may also be used as well. Also, glass substrates may be used.

Figure 5A:
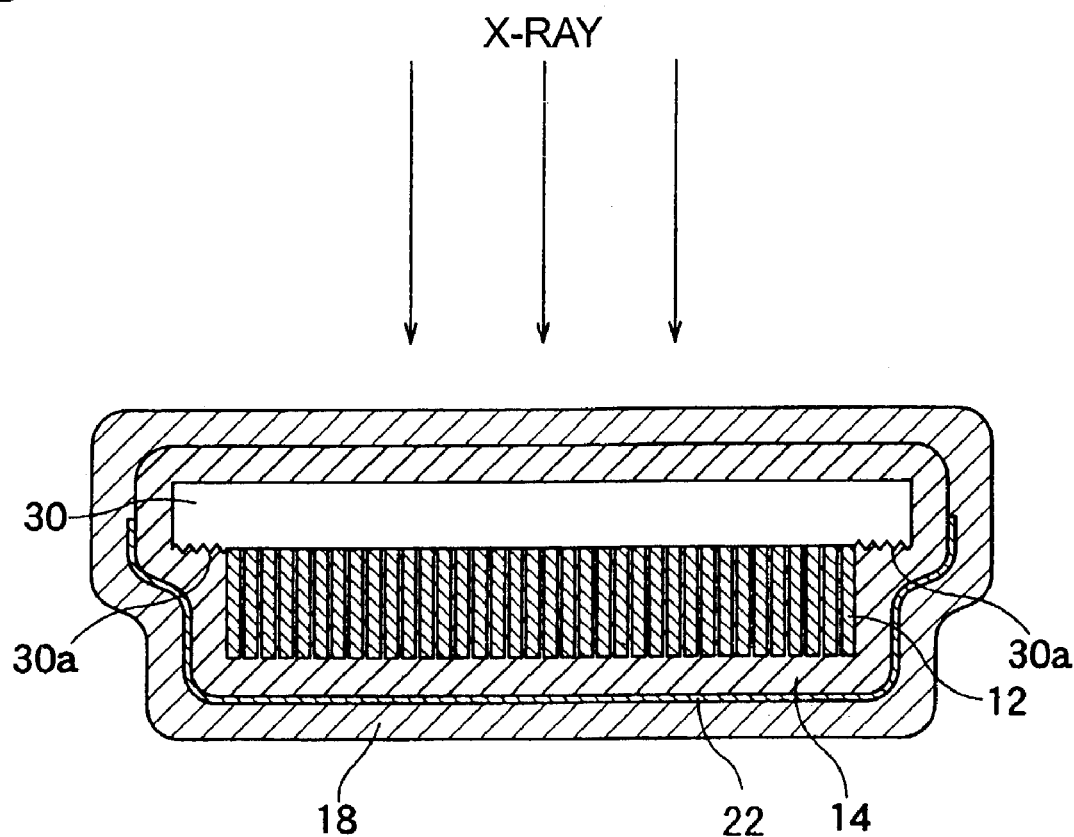
FIGS. 5A and 5B are sectional views of the scintillator panels in accordance with other embodiments of the present invention.
Figure 5B:
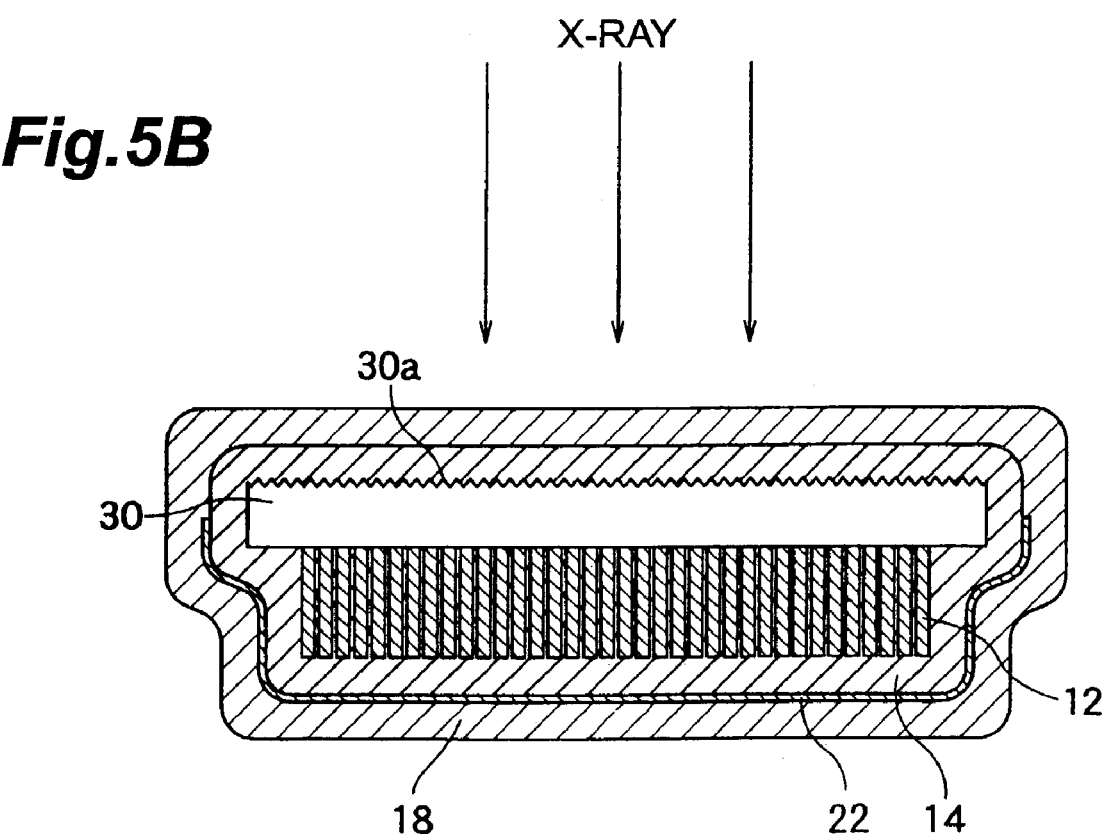

FIGS. 5A and 5B are views showing scintillator panels in which a scintillator 12 is formed on a surface of a substrate 30 made of amorphous carbon, and a first polyparaxylylene film 14 for protecting the scintillator 12, a transparent inorganic film (SiO$_2$ film) 22, and a second polyparaxylylene film 18 are formed. In the scintillator panels shown in FIGS. 5A and 5B, all surfaces of the amorphous carbon substrate 30 and scintillator 12 are covered with the first polyparaxylylene film 14 and the second polyparaxylylene film 18. A protective film peeling prevention rough 30a is formed on the surface of amorphous carbon substrate 30 formed with the scintillator 12 at a part not covered with the scintillator 12 in the scintillator panel of FIG. 5A, and a protective film peeling prevention rough 30a is formed on the surface of Al substrate 30 not formed with the scintillator 12 in the scintillator panel of FIG. 5B, whereby the first polyparaxylylene film 14 formed on the amorphous carbon substrate 30 can be prevented from floating up and peeling in these cases. The side wall portion of Al substrate 30 may further be provided with a protection film peeling prevention rough in these cases. Here, the transparent inorganic film may be any of Al$_2$O$_3$, TiO$_2$, In$_2$O$_3$, SnO$_2$, MgO, SiN, MgF$_2$, LiF, CaF$_2$, AgCl, and SiNO.

Figure 6A:
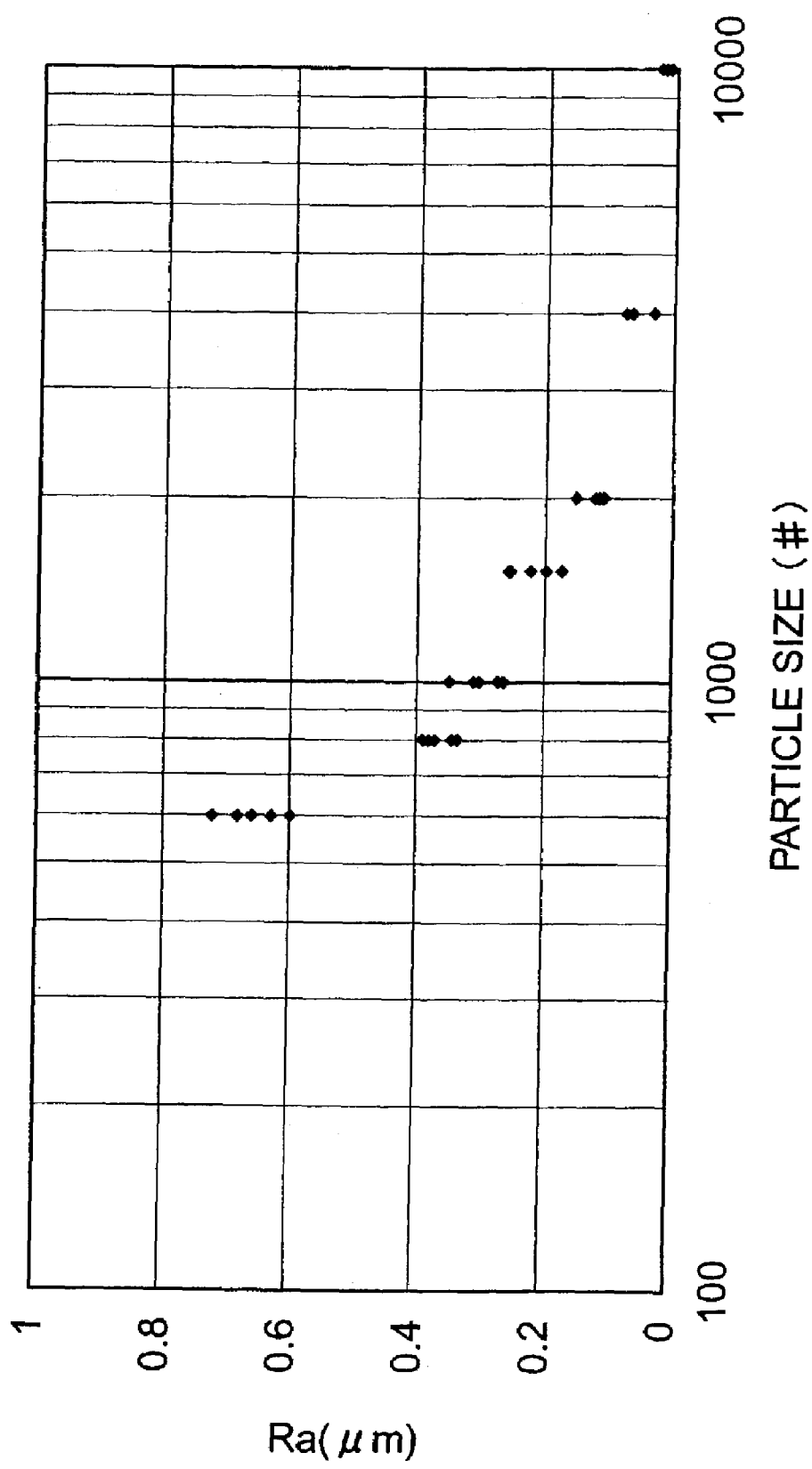
FIG. 6A is a chart showing the relationship between the surface roughness Ra of substrate in an embodiment of the present invention and the particle size of powder for grinding the substrate.
Figure 6B:
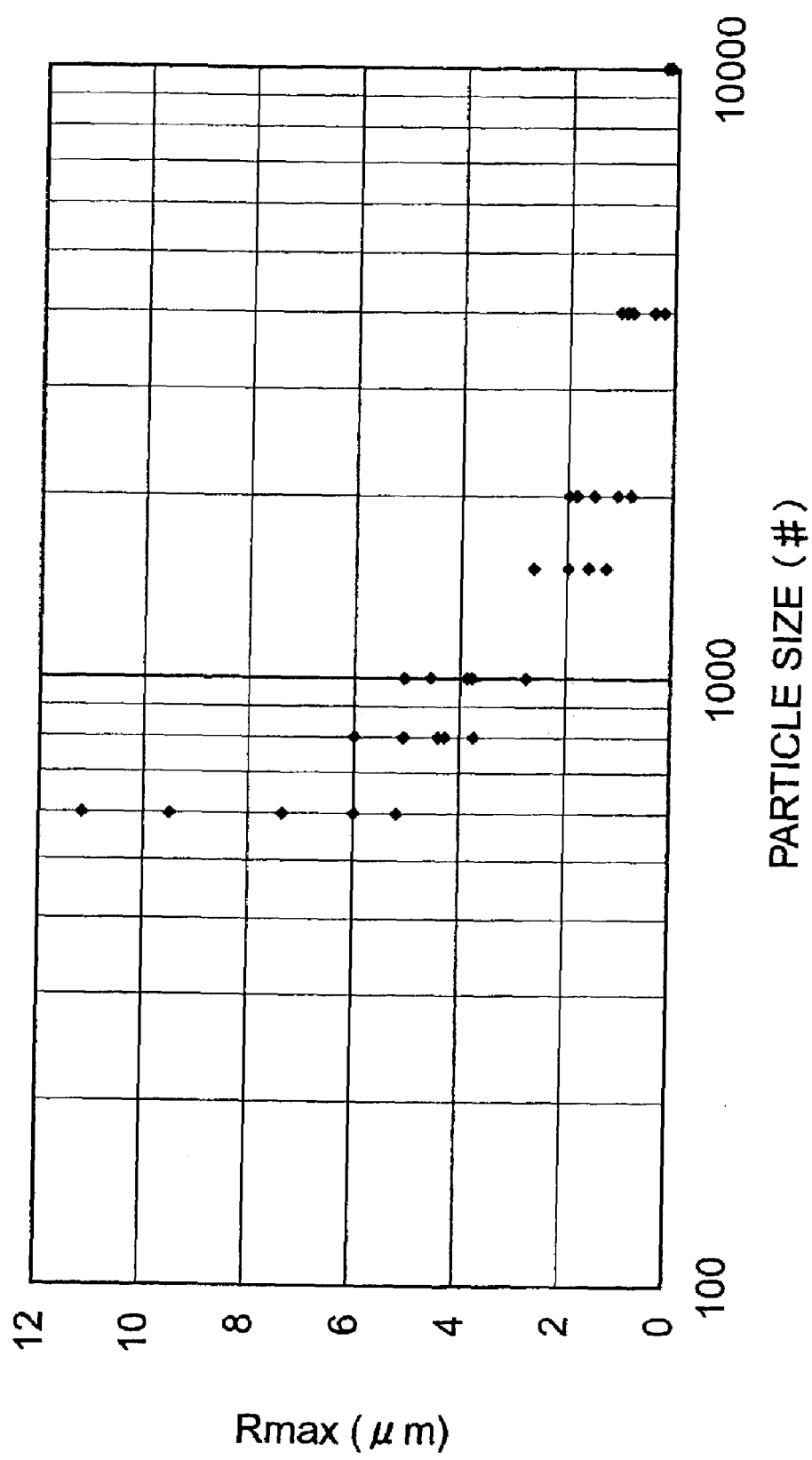
FIG. 6B is a chart showing the relationship between the surface roughness Rmax of substrate in an embodiment of the present invention and the particle size of powder for grinding the substrate.

When making the scintillator panel of the above-mentioned embodiment, the relationship between the adhesion of the substrate and protective film and the magnitude of protective film peeling prevention rough was studied. Amorphous carbon (a-C) sheets having a thickness of 1 mm were ground with SiC grinding powders whose particle size varies from #600 to #10000 (seven kinds of #600, #800, #1000, #1500, #2000, #4000, and #10000), so as to prepare amorphous carbon substrates having different surface roughness values, and then their surface roughness values Ra and Rmax were measured with a surface roughness meter. The relationships between the particle size of grinding powder and Ra and Rmax are shown in FIGS. 6A and 6B.

Figure 7A:
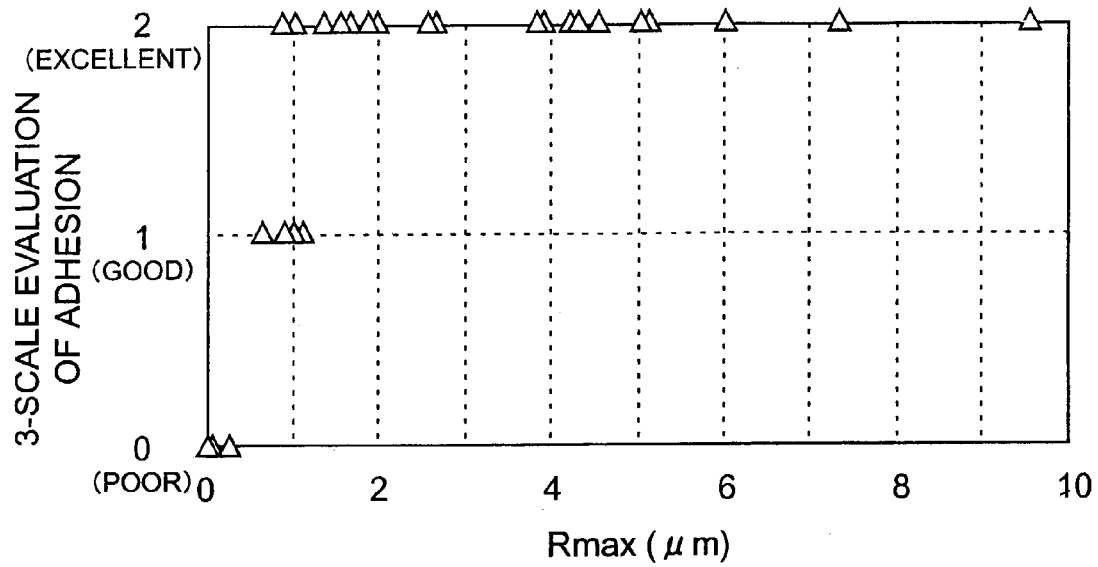
FIG. 7A is a chart showing the relationship between the surface roughness Ra of substrate and the adhesion of the amorphous carbon substrate and a protective film.
Figure 7B:
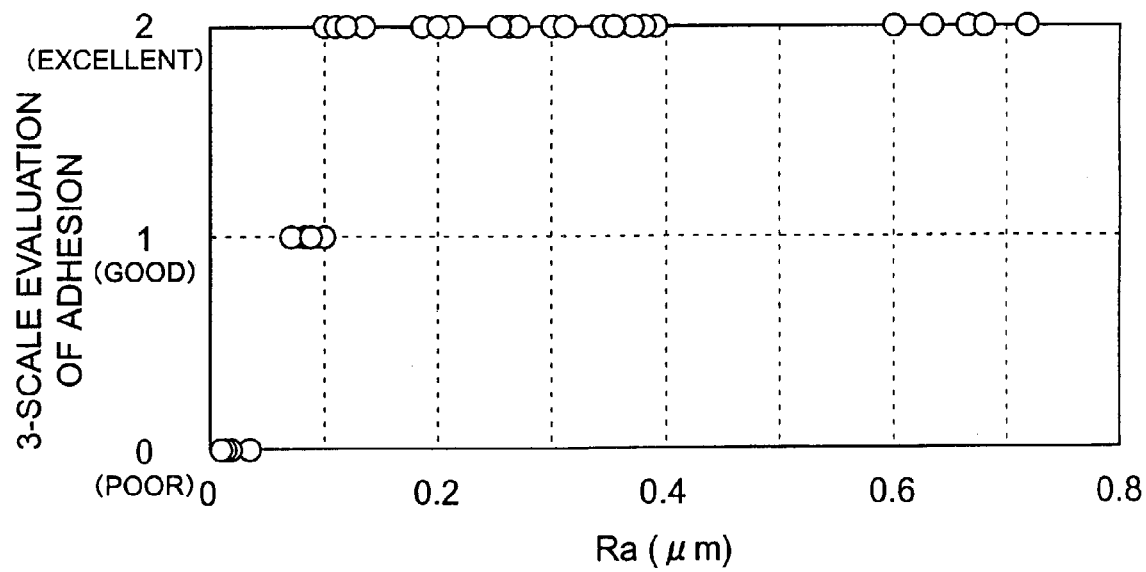
FIG. 7B is a view showing the relationship between the surface roughness Rmax of substrate and the adhesion of the amorphous carbon substrate and a protective film.

Next, CsI was deposited by 200 μm on each of thus prepared amorphous carbon substrates, a polyparaxylylene film was subsequently formed thereon by CVD method, and then the relationships between the adhesion of CsI and the amorphous carbon substrate, the adhesion of substrate and protective film at the protective film peeling prevention rough 30a in FIG. 5B in particular, and Ra and Rmax were studied, whereby the results shown in FIGS. 7A and 7B were obtained.

As can be seen from these charts, it has been found that the case where the film is formed on an amorphous carbon substrate having an Ra of at least 0.1 μm and an Rmax of at least 0.8 μm is effective in adhesion.

Namely, it has been found that, in the case where the above-mentioned FOP and amorphous carbon are used as the substrate, the surface roughness functioning as the protective film peeling prevention rough has an Ra of at least 0.1 μm and an Rmax of at least 0.8 μm.

The scintillator panel using the amorphous carbon substrate 30 is used as a radiation image sensor when an imaging device is disposed on the tip side of the scintillator 12. In the case where a substrate made of Al, a substrate made of Be, or the like is used, the scintillator panel is similarly used as a radiation image sensor. In the case where a glass substrate is used, the scintillator panel is used as a radiation image sensor when an imaging device is disposed on the glass substrate side with a lens interposed therebetween.

The magnitude of protective film peeling prevention rough described in the foregoing is applicable not only to the FOP and amorphous carbon substrate, but also to substrates made of Al and other materials. The protective film in the above-mentioned embodiment includes not only polyparaxylylene, but also polymonochloroparaxylylene, polydichloroparaxylylene, polytetrachloroparaxylylene, polyfluoroparaxylylene, polyfluoroparaxylylene, polydimethylparaxylylene, polydiethylparaxylylene, and the like.

According to the scintillator panel of the present invention, since the transparent organic film for protecting the scintillator is formed so as to reach the protective film peeling prevention rough provided in the substrate, the contact area between the transparent organic film and substrate is enhanced by the protective film peeling prevention rough, so that the transparent organic film can be prevented from peeling, whereby the moisture resistance of scintillator can be improved. In the case where the protective film peeling prevention rough is disposed at a side wall of the substrate, the transparent organic film can be prevented from peeling even when a frictional force acts from the underside of the substrate toward the surface and the like.

According to the radiation image sensor of the present invention, since the transparent organic film for protecting the scintillator is formed so as to reach the protective film peeling prevention rough provided in the imaging device, the contact area between the transparent organic film and imaging device is enhanced by the protective film peeling prevention rough, so that the transparent organic film can be prevented from peeling, whereby the moisture resistance of scintillator can be improved. In the case where the protective film peeling prevention rough is disposed at a side wall of the imaging device, the transparent organic film can be prevented from peeling even when a frictional force acts from the underside of the imaging device toward the surface and the like.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A scintillator panel comprising a scintillator formed on a fiber optical plate and a transparent organic film as a protective film covering the top and side portions of said scintillator,
   wherein the transparent organic film is directly formed on the scintillator, and
   wherein said fiber optical plate has a protective film peeling prevention rough at a portion thereon coming into contact with said transparent organic film on side walls of the fiber optical plate so as to contact with said transparent organic film, and said transparent organic film is integrally formed from the top portions of said scintillator to a portion over said protective film peeling prevention rough,
   the scintillator panel further comprising: a light reflecting film disposed on said transparent organic film above said scintillator; and
   a second organic film of the same material as the transparent organic film, covering said light reflecting film, the light reflecting film being sealed by the transparent organic film and the second organic film.

2. A radiation image sensor comprising:
   a scintillator panel according to claim 1; and
   an imaging device disposed on opposite side to the scintillator forming side of said fiber optical plate.

* * * * *